G. W. FLAD.
ENGINE JACK.
APPLICATION FILED APR. 11, 1910.
1,000,674.
Patented Aug. 15, 1911.
2 SHEETS—SHEET 1.
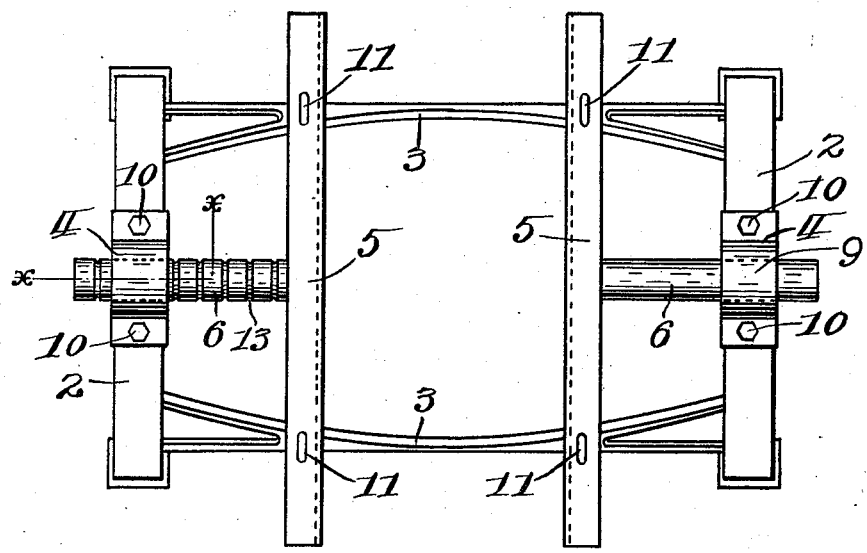
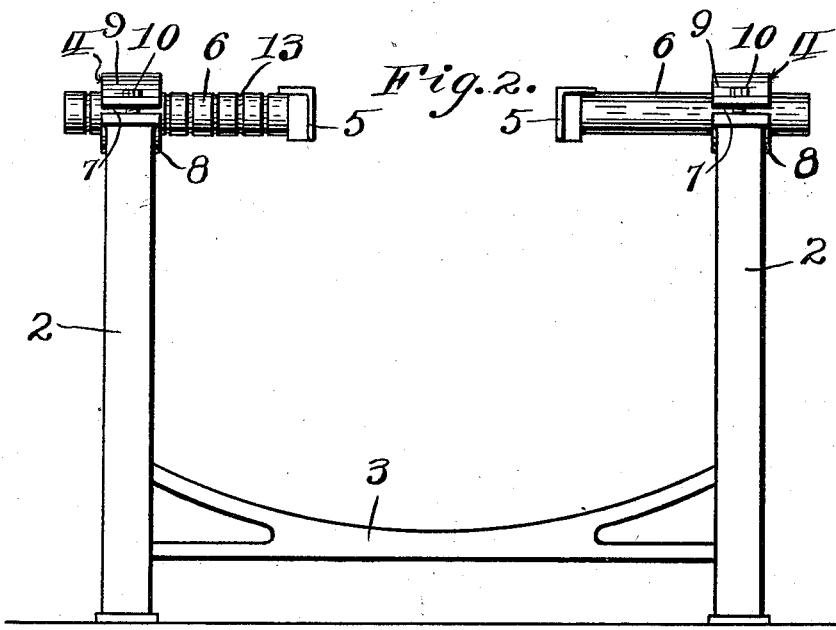
Witnesses:
K. H. Hansen
U. H. Williams
Inventor:
George W. Flad,
by: John E. Stryker
His Attorney.

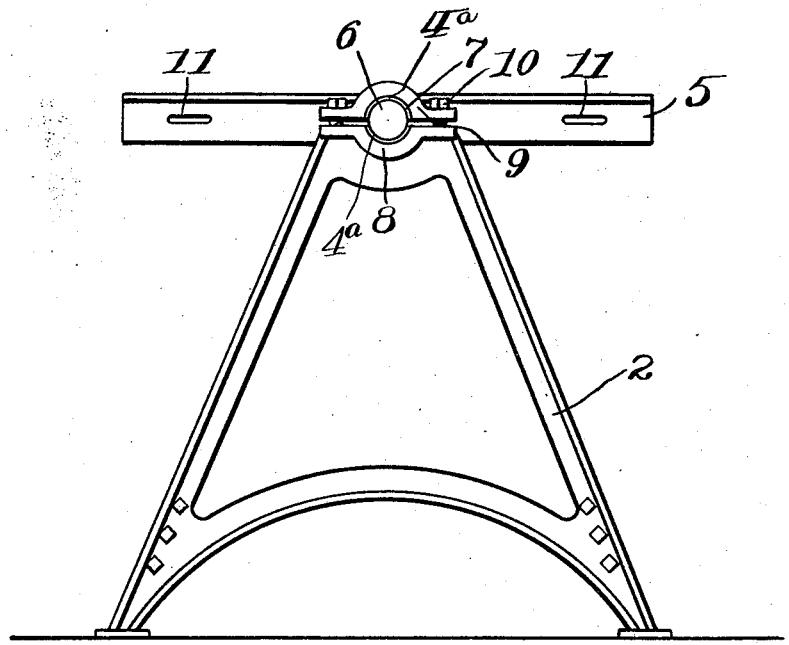

UNITED STATES PATENT OFFICE.

GEORGE W. FLAD, OF ST. PAUL, MINNESOTA.

ENGINE-JACK.

1,000,674. Specification of Letters Patent. Patented Aug. 15, 1911.

Application filed April 11, 1910. Serial No. 554,720.

*To all whom it may concern:*

Be it known that I, GEORGE W. FLAD, a citizen of the United States, residing at St. Paul, in the county of Ramsey and State of Minnesota, have invented new and useful Improvements in Engine-Jacks, of which the following is a specification.

My invention relates to improvements in engine jacks of the class adapted for supporting automobile engines and similar mechanisms while in the shop during the process of overhauling and repair.

My object is to provide an adjustable support adapted to hold engines of different types and dimensions and present them to the mechanic in a position to facilitate work thereon, and also to make easy changes in the position of the engine without injury thereto.

In the drawings, Figure 1 is a plan of my improved jack; Fig. 2 is a front elevation; Fig. 3 is an end elevation, and Fig. 4 is an enlarged detail partly in section on the line $x-x$ of Fig. 1.

The device comprises end frames 2, connected by side braces 3, clamps 4, one on each of the end frames, an engine support composed of two rails 5, each provided with a rigidly attached axle 6, the outer portion of which forms a journal 7. The lower and stationary member of each clamp 4 forms a bearing 8 for one of the journals 7. The bearings 8 are carried by the end frames 2, and the caps 9, forming the second member of the clamp, are connected with said bearing by set screws 10. Thus the journals 7 are supported in the bearings 8, and when the set screws 10 are loose, the journals may be moved transversely toward or from each other for the purpose of adjusting them to various sizes of engines as hereinafter described, and when so adjusted, the engine may be revolved so as to present it in the most convenient position to the machinist who is working thereon. After being so placed, the set screws in the clamps 4 are tightened and the engine may be held rigidly in one situation until it becomes desirable to alter its position, when by manipulating the screws it can be turned and again rigidly adjusted. The supports are preferably made of angle iron, and both flanges thereof are perforated at suitable distances with bolt holes or slots 11 to receive the bolts by which the engine is held in place.

Engines of substantially all standard types are attached to the automobile by means of bolts passing through flanges provided in brackets on the engine frame and through the sub-frame of the automobile. Some of these flanges project vertically from the brackets and others horizontally according to the style of engine. It is by means of these brackets that the engine is secured to the supports 5 of my jack, by bolts clamped through the flanges on the engine bracket and the holes 11 in either the horizontal or vertical flange of the support 5. The use of slotted holes 11 in both flanges of the rails 5 adapts the jack to receive a considerable range of sizes and styles of engines, and by merely drilling new holes in the rails 5, the device can be used on any ordinary engine.

The clamps 4 are fitted with bushings $4^a$ in the usual manner. On one of said bushings is formed an annular flange 12, adapted to fit in the corrugations 13 on one of the axles. When the flange 12 is adjusted in one of the corrugations 13, a stop is formed to prevent side play of the journals in these bearings, while an engine clamped in the support is being turned. I thus guard against the possibility of one of the journals slipping from its bearings to the injury of the engine.

It is, of course, obvious that my device is adapted to hold transmissions and other mechanisms as well as engines.

Having described my invention, what I claim as new and desire to protect by Letters Patent is:

1. An engine jack, comprising rigidly connected vertical end frames, a clamp upon each of said frames and a separable engine support provided with axles at right angles thereto, said axles terminating in journals adapted to be adjusted longitudinally and angularly, and to be held in said clamps and said supports being perforated to receive bolts for the purpose of clamping an engine thereon.

2. An engine jack comprising end frames, each supporting a grip bearing, an engine support having axles mounted in said bearings, which are adapted when loosely adjusted to form a journal and when tightly adjusted to form a clamp for said axles; one of said bearings and journals having a rib and groove engagement constituting a stop to prevent horizontal movement of the axles in the grip bearings.

In testimony whereof, I have signed my name to this specification in the presence of two subscribing witnesses.

GEORGE W. FLAD.

Witnesses:
JOHN E. STRYKER,
K. H. HANSEN.

Copies of this patent may be obtained for five cents each, by addressing the "Commissioner of Patents, Washington, D. C."